(12) United States Patent
Hardwick

(10) Patent No.: US 12,703,211 B2
(45) Date of Patent: Aug. 11, 2026

(54) HITCH MOUNT FOR A FRONT END OF A VEHICLE

(71) Applicant: Ross Hardwick, Devine, TX (US)

(72) Inventor: Ross Hardwick, Devine, TX (US)

( * ) Notice: Subject to any disclaimer, the term of this patent is extended or adjusted under 35 U.S.C. 154(b) by 602 days.

(21) Appl. No.: 18/198,826

(22) Filed: May 17, 2023

(65) Prior Publication Data

US 2024/0383289 A1 Nov. 21, 2024

(51) Int. Cl.
*B60D 1/52* (2006.01)
*B60D 1/24* (2006.01)

(52) U.S. Cl.
CPC ................ *B60D 1/52* (2013.01); *B60D 1/24* (2013.01)

(58) Field of Classification Search
CPC ... B60D 1/52; B60D 1/24; B60D 1/48; B60D 1/58; B60D 3/00
USPC .......................................................... 280/495
See application file for complete search history.

(56) References Cited

U.S. PATENT DOCUMENTS 3,431,005 A 3/1969 Priefert
3,510,146 A * 5/1970 Hartman ................ B60D 1/143 280/491.5
5,707,072 A 1/1998 Hopper
6,378,819 B1 4/2002 Johnson
6,902,183 B2 6/2005 Rodgers
D591,208 S 4/2009 Wubker, Jr.
8,220,849 B2 7/2012 Beaird, III
8,448,882 B2 5/2013 Kemmerling
2005/0275194 A1* 12/2005 Wegener .................. B60D 1/56 280/500
2010/0096347 A1* 4/2010 Theobald .................. B60R 9/10 211/13.1
2017/0282779 A1* 10/2017 Mettler ..................... B60R 9/06
2019/0270423 A1* 9/2019 Hutton ...................... B60R 9/06
2021/0101538 A1* 4/2021 Gaddis ...................... B60R 9/10

FOREIGN PATENT DOCUMENTS

WO WO2011022135 2/2011

* cited by examiner

*Primary Examiner* — John Olszewski
*Assistant Examiner* — Nathaniel William Watkins

(57) ABSTRACT

A mount apparatus for mounting a hitch-mountable device on a front end of a vehicle includes a base plate with a front surface and a back surface each extending between a top edge and a bottom edge of the base plate and between a first lateral edge and a second lateral edge of the base plate. A hook is coupled to the top edge of the base plate. The hook extending rearwardly and downwardly from the top edge and is configured for engaging a top of the vehicle grill guard to attach the base plate to the vehicle grill guard. A receiver hitch tube is coupled to and extending forwardly from the front surface of the base plate.

10 Claims, 7 Drawing Sheets

HITCH MOUNT FOR A FRONT END OF A VEHICLE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hitch apparatuses and more particularly pertains to a new hitch apparatus for mounting a hitch-mountable device on a front end of a vehicle.

(2) Description of Related Art Including Information Disclosed Under 37 CFR 1.97 and 1.98

The prior art describes several hitch apparatuses for mounting a hitch-mountable device to a front of a vehicle. Some such hitch apparatuses comprise a device which is integral to a bumper of the vehicle. Others are integral to a grill guard of the vehicle. However, the prior art does not describe such an apparatus which may hook onto an extrinsic grill guard, nor does it describe such an apparatus which may further secure to the extrinsic grill guard via locking pins, cable locks, or other fasteners. Such an apparatus would be advantageous over the prior art, because the apparatus is detachable from the grill guard and positionable as desired in a plurality of positions on the grill guard.

BRIEF SUMMARY OF THE INVENTION

An embodiment of the disclosure meets the needs presented above by generally comprising a base plate with a front surface and a back surface each extending between a top edge and a bottom edge of the base plate and between a first lateral edge and a second lateral edge of the base plate. A hook is coupled to the top edge of the base plate. The hook extending rearwardly and downwardly from the top edge and is configured for engaging a top of the vehicle grill guard to attach the base plate to the vehicle grill guard. A receiver hitch tube is coupled to and extending forwardly from the front surface of the base plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
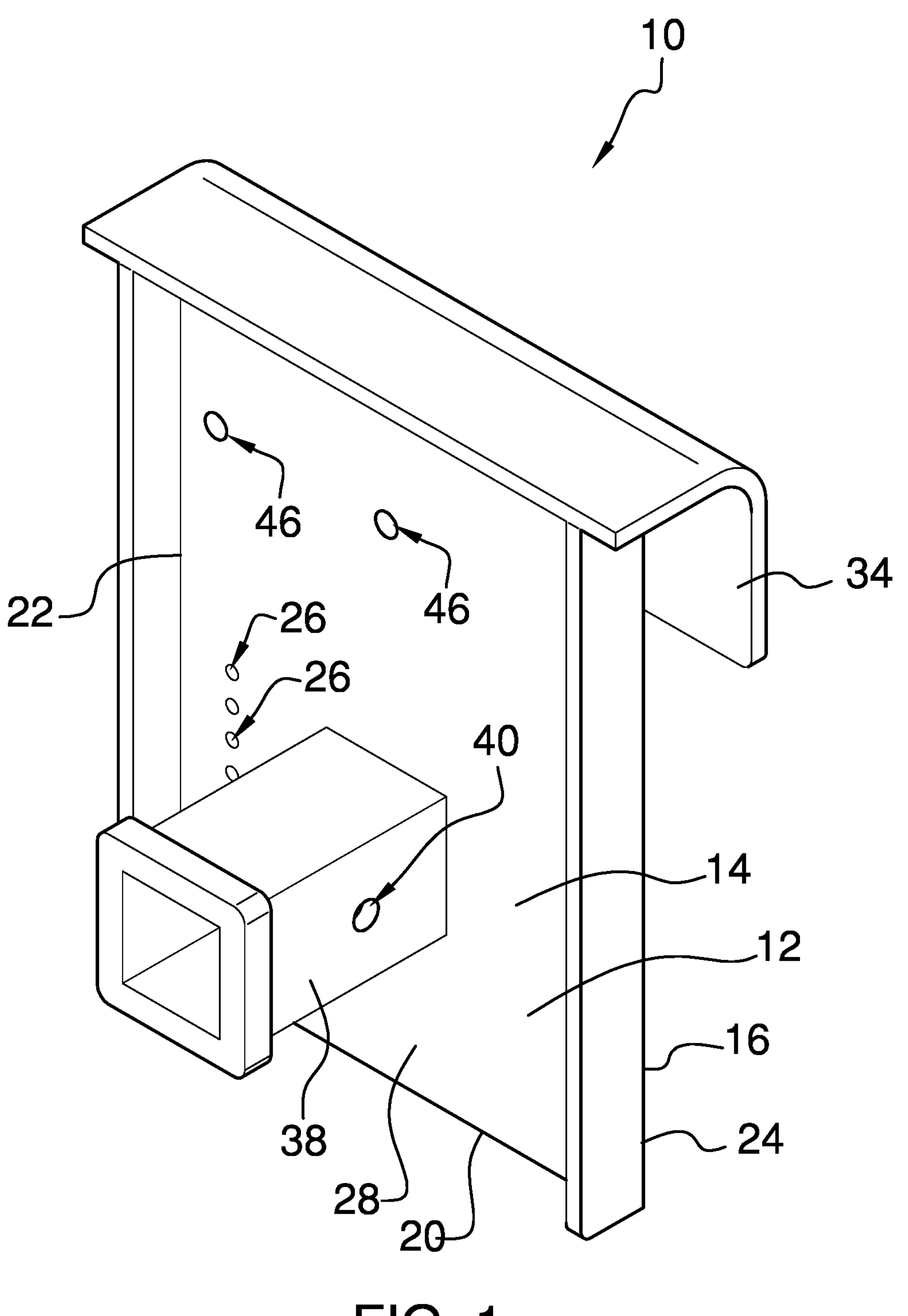
FIG. 1 is a top front side perspective view of a mount apparatus according to an embodiment of the disclosure.
Figure 2:
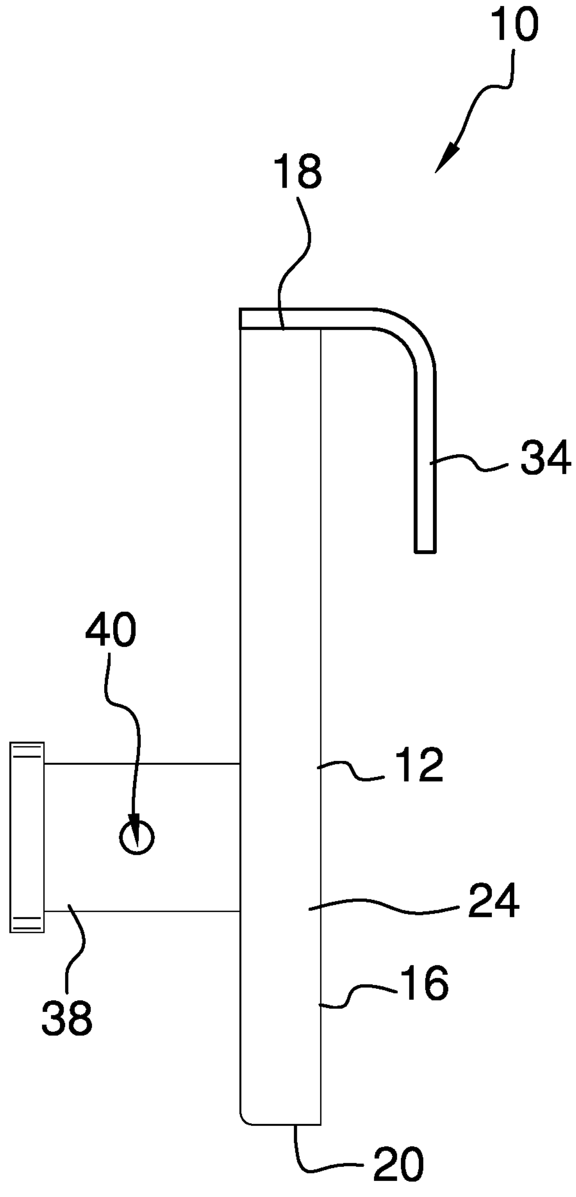
FIG. 2 is a side view of an embodiment of the disclosure.
Figure 3:
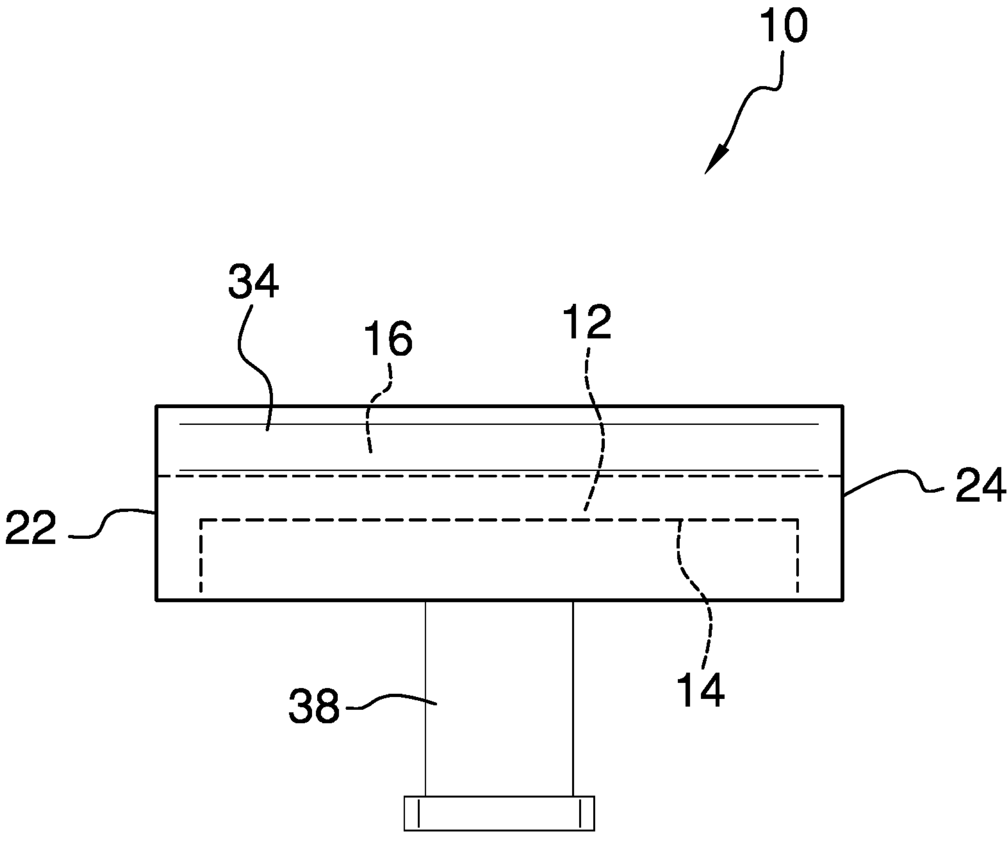
FIG. 3 is a top view of an embodiment of the disclosure.
Figure 4:
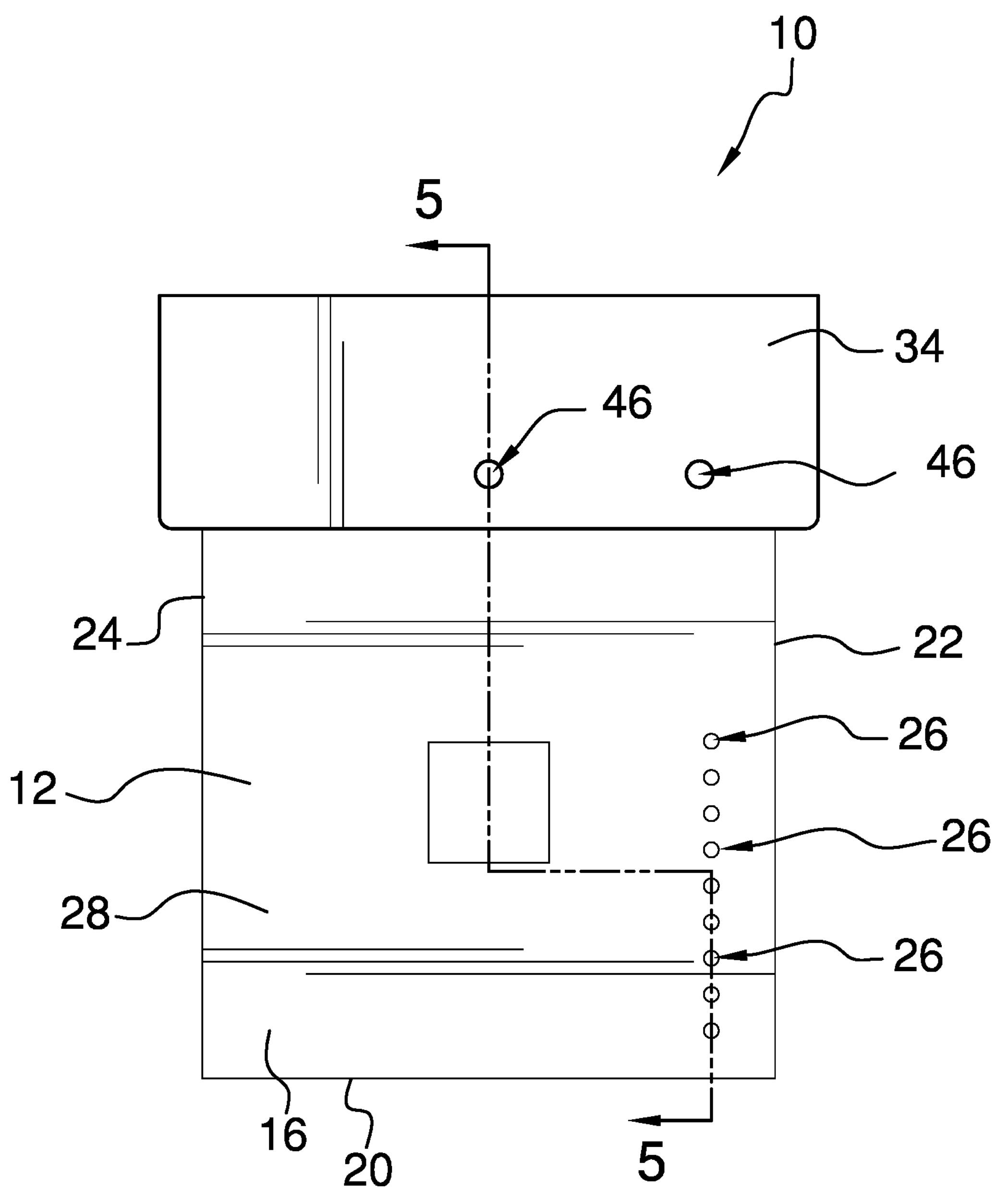
FIG. 4 is a rear view of an embodiment of the disclosure.
Figure 5:
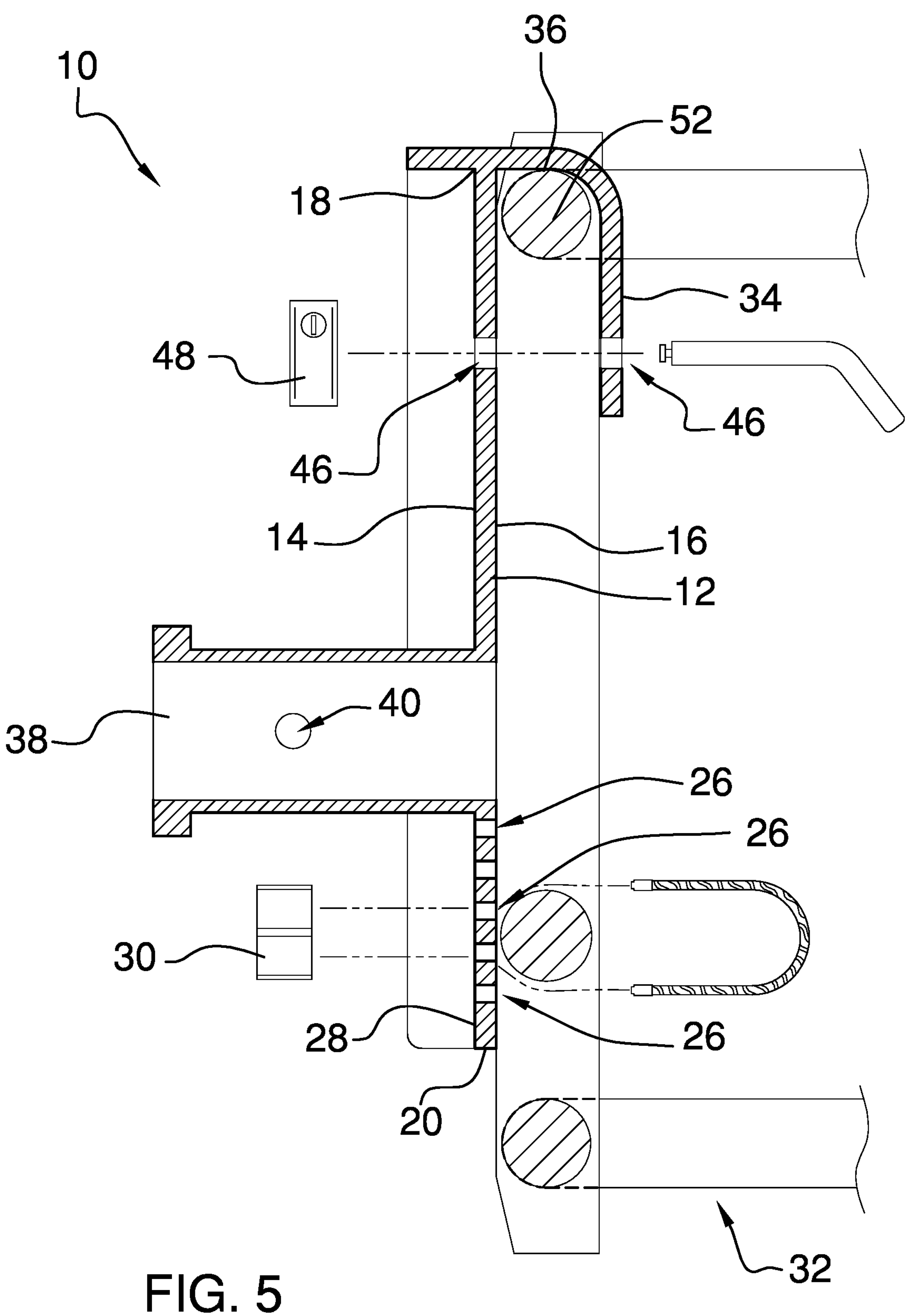
FIG. 5 is a cross-sectional in-use view of an embodiment of the disclosure taken from Arrows 5-5 in FIG. 4.
Figure 6:
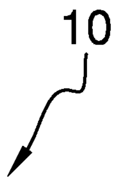
FIG. 6 is a front view of an embodiment of the disclosure.
Figure 6:
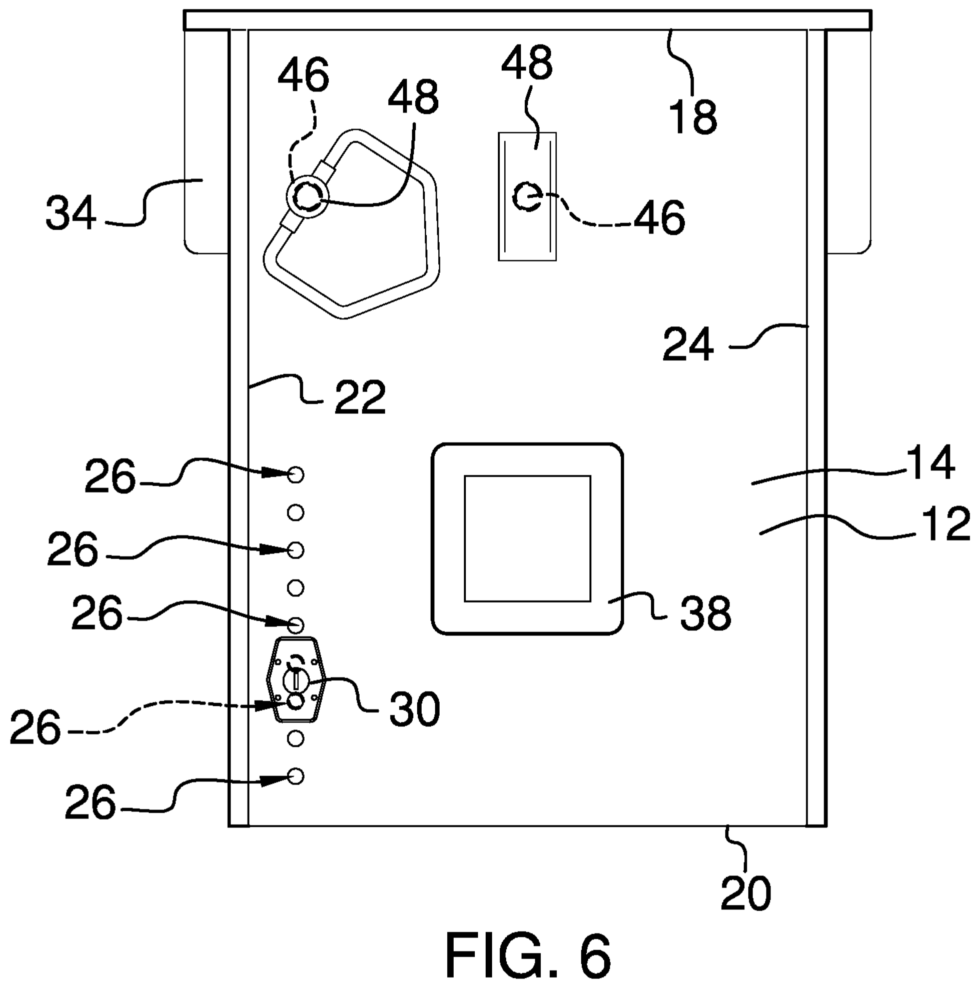
Figure 7:
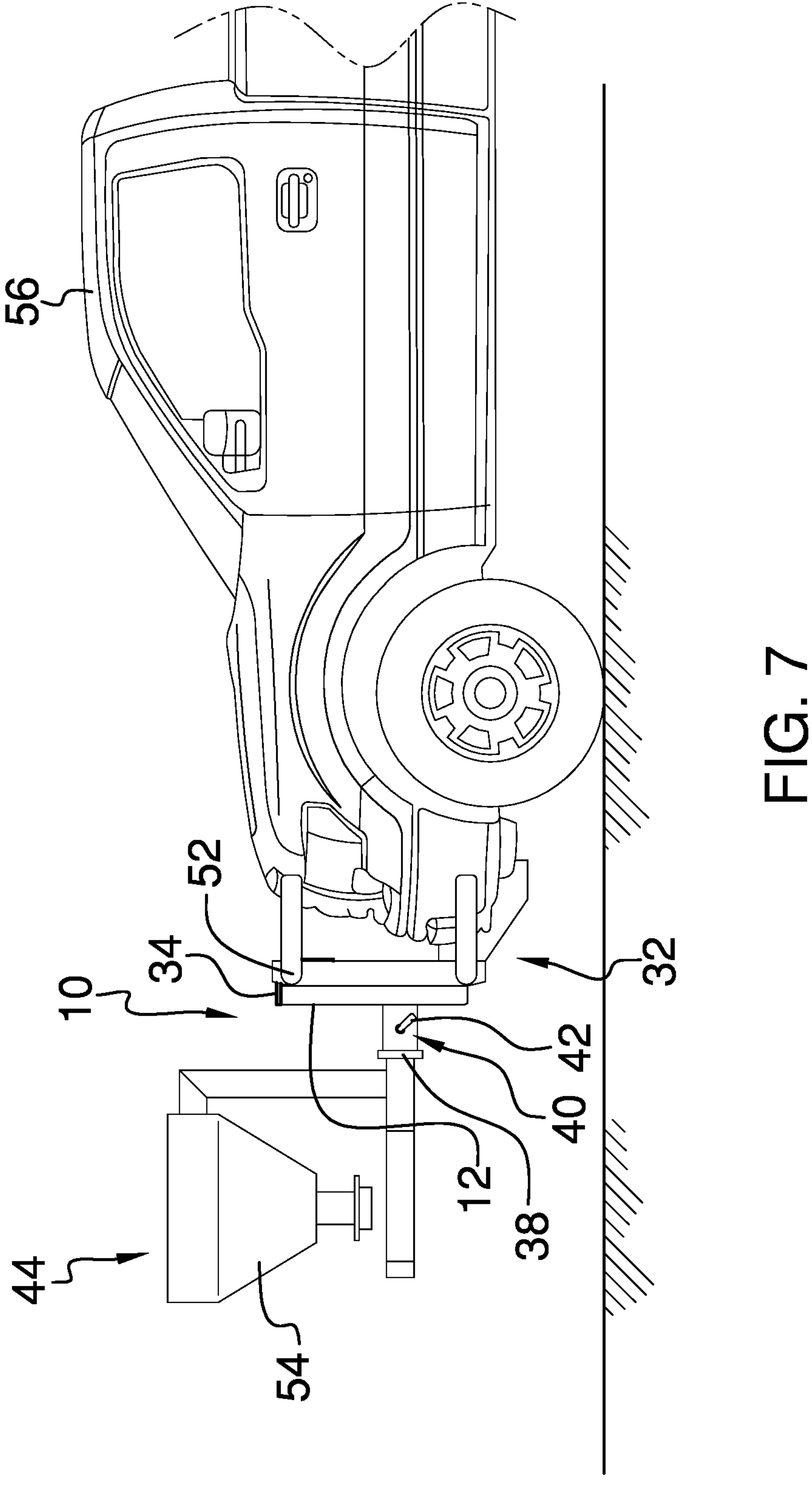
FIG. 7 is a side in-use view of an embodiment of the disclosure.

With reference now to the drawings, and in particular to FIGS. 1 through 7 thereof, a new hitch apparatus embodying the principles and concepts of an embodiment of the disclosure and generally designated by the reference numeral 10 will be described.

As best illustrated in FIGS. 1 through 7, the mount apparatus 10 generally comprises a base plate 12 with a front surface 14 and a back surface 16 each extending between a top edge 18 and a bottom edge 20 of the base plate 12 and between a first lateral edge 22 and a second lateral edge 24 of the base plate 12. The base plate 12 has a plurality of cable holes 26 extending therethrough which is arranged along a vertical line extending through the base plate 12. A diameter of each cable hole 26 of the plurality of cable holes 26 is between 0.25 inches and 0.75 inches. A spacing between adjacent pairs of cable holes 26 of the plurality of cable holes 26 is between 0.5 inches and 1.0 inches. The plurality of cable holes 26 is positioned on a lower portion 28 of the base plate 12 and adjacent to the first lateral edge 22. A cable lock 30 is insertable through each one of a selected pair of cable holes 26 of the plurality of cable holes 26. The cable lock 30 is configured to secure the lower portion 28 of the base plate 12 against a vehicle grill guard 32. The plurality of cable holes 26 may also receive other fasteners therethrough to secure the lower portion 28 of the base plate 12 against the vehicle grill guard 32, such as zip ties, threaded fasteners, pins, or the like.

A hook 34 is coupled to the top edge 18 of the base plate 12. The hook 34 extends rearwardly and downwardly from the top edge 18 and is configured for engaging a top 36 of the vehicle grill guard 32 to attach the base plate 12 to the vehicle grill guard 32. The hook 34 extends from the first lateral edge 22 of the base plate 12 to the second lateral edge 24 of the base plate 12 and further extends laterally past each of the first lateral edge 22 and the second lateral edge 24. The hook 34 has an L-shaped cross-section taken along a vertical plane extending through the hook 34.

A receiver hitch tube 38 is coupled to and extends forwardly from the front surface 14 of the base plate 12, the receiver hitch tube 38 has a locking pin hole 40 extending therethrough configured for receiving a locking pin 42 to attach a hitch-mountable device 44 to the receiver hitch tube 38.

The base plate 12 and the hook 34 each have a pair of securement pin holes 46 extending therethrough. Each securement pin hole 46 of the pair of securement pin holes 46 of the base plate 12 align with an associated one of the pair of securement pin holes 46 of the hook 34. A securement pin 48 is insertable into a selected one of the pair of securement pin holes 46 of the base plate 12 and the associated securement pin hole 46 of the hook 34 to form a closed loop with the base plate 12 and the hook 34. The closed loop is positionable such that the closed loop is configured for receiving a crossbar 52 of the vehicle grill guard 32. The pair of securement pin holes 46 of the base plate 12 and the pair of securement pin holes 46 of the hook 34 may also receive threaded fasteners, zip ties, or the like to form the closed loop.

In use, the hook 34 is positioned in engagement with the top 36 of the vehicle grill guard 32 to hang the base plate 12 onto the vehicle grill guard 32. The securement pin 48, cable lock 30, or other fasteners may be inserted through one or more cable holes 26 of the plurality of cable holes 26 or one of the pair of securement pin holes 46 of the base plate 12 and the associated securement pin hole 46 of the hook 34 to further secure the base plate 12 to the vehicle grill guard 32. The plurality of cable holes 26 are particularly adapted for preventing rotation of the base plate 12 around the top 36 of the vehicle grill guard 32 due to sporadic movements of the vehicle grill guard 32 such as those caused by driving over rough terrain. The hitch-mountable device 44 is mounted to the receiver hitch tube 38, and the locking pin 42 is inserted through the receiver hitch tube 38 to lock the hitch-mountable device 44 to the receiver hitch tube 38. Thus placed, the hitch-mountable device 44 may be moved around by a vehicle 56 to which the vehicle grill guard 32 is attached. The hitch-mountable device 44 may, for example, be a feed broadcasting device 54, and mounting the hitch-mountable device 44 onto the vehicle grill guard 32 frees the rear of the vehicle 56 from being obstructed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mount apparatus for attaching a hitch-mountable device to a vehicle grill guard, the apparatus comprising:

a base plate having a front surface and a back surface each extending between a top edge and a bottom edge of the base plate and between a first lateral edge and a second lateral edge of the base plate, the base plate having a plurality of cable holes extending therethrough, the plurality of cable holes being positioned on a lower portion of the base plate, the plurality of cable holes being configured for facilitating securing a lower portion of the base plate to the vehicle grill guard via a fastener;

a hook being coupled to the top edge of the base plate, the hook extending rearwardly and downwardly from the top edge, the hook being configured for engaging a top of the vehicle grill guard to attach the base plate to the vehicle grill guard;

a receiver hitch tube being coupled to and extending forwardly from the front surface of the base plate; and a cable lock being insertable through each one of a selected pair of cable holes of the plurality of cable holes, the cable lock being configured to secure the lower portion of the base plate against the vehicle grill guard.

2. The apparatus of claim 1, wherein the plurality of cable holes is arranged along a vertical line extending through the base plate.

3. The apparatus of claim 1, wherein a diameter of each cable hole of the plurality of cable holes is between 0.25 inches and 0.75 inches.

4. The apparatus of claim 1, wherein a spacing between adjacent pairs of cable holes of the plurality of cable holes is between 0.5 inches and 1.0 inches.

5. The apparatus of claim 1, wherein the plurality of cable holes is positioned adjacent to the first lateral edge.

6. The apparatus of claim 1, wherein the hook extends from the first lateral edge of the base plate to the second lateral edge of the base plate, the hook further extending laterally past each of the first lateral edge and the second lateral edge.

7. The apparatus of claim 1, wherein the hook has an L-shaped cross-section taken along a vertical plane extending through the hook.

8. The apparatus of claim 1, wherein the receiver hitch tube has a locking pin hole extending therethrough configured for receiving a locking pin to attach the hitch-mountable device to the receiver hitch tube.

9. The apparatus of claim 1, further comprising a securement pin being couplable to the base plate and the hook, wherein the base plate and the hook each have a pair of securement pin holes extending therethrough, each securement pin hole of the pair of securement pin holes of the base plate aligning with an associated one of the pair of securement pin holes of the hook, the securement pin being insertable into a selected one of the pair of securement pin holes of the base plate and the associated securement pin hole of the hook to form a closed loop with the base plate and the hook, the closed loop being positionable such that the closed loop is configured for receiving a crossbar of the vehicle grill guard.

10. A mount apparatus for attaching a hitch-mountable device to a vehicle grill guard, the apparatus comprising:

a base plate having a front surface and a back surface each extending between a top edge and a bottom edge of the base plate and between a first lateral edge and a second lateral edge of the base plate, the base plate having a plurality of cable holes extending therethrough, the plurality of cable holes being arranged along a vertical line extending through the base plate, a diameter of each cable hole of the plurality of cable holes being between 0.25 inches and 0.75 inches, a spacing between adjacent pairs of cable holes of the plurality of cable holes being between 0.5 inches and 1.0 inches, the plurality of holes being positioned on a lower portion of the base plate and adjacent to the first lateral edge;

a hook being coupled to the top edge of the base plate, the hook extending rearwardly and downwardly from the top edge, the hook being configured for engaging a top of the vehicle grill guard to attach the base plate to the vehicle grill guard, the hook extending from the first lateral edge of the base plate to the second lateral edge of the base plate, the hook further extending laterally past each of the first lateral edge and the second lateral edge, the hook having an L-shaped cross-section taken along a vertical plane extending through the hook;

a receiver hitch tube being coupled to and extending forwardly from the front surface of the base plate, the receiver hitch tube having a locking pin hole extending therethrough configured for receiving a locking pin to attach the hitch-mountable device to the receiver hitch tube;

a cable lock being insertable through each one of a selected pair of cable holes of the plurality of cable holes, the cable lock being configured to secure the lower portion of the base plate against the vehicle grill guard;

wherein the base plate and the hook each have a pair of securement pin holes extending therethrough, each securement pin hole of the pair of securement pin holes of the base plate aligning with an associated one of the pair of securement pin holes of the hook; and a securement pin being insertable into a selected one of the pair of securement pin holes of the base plate and the associated securement pin hole of the hook to form a closed loop with the base plate and the hook, the closed loop being positionable such that the closed loop is configured for receiving a crossbar of the vehicle grill guard.

* * * * *